United States Patent
Bertolini et al.

[11] Patent Number: 6,029,403
[45] Date of Patent: Feb. 29, 2000

[54] METHOD FOR THE SEALED MOUNTING OF A WINDOW-LIFTER MECHANISM IN A VEHICLE DOOR AND DOOR FOR THE APPLICATION OF THIS METHOD

[75] Inventors: Carlo Bertolini, Feucherolles; Thierry Pebre, Checy; Laurent Arquevaux, Sully sur Loire, all of France

[73] Assignee: Meritor Light Vehicle Systems, LLC, Sully sur Loire, France

[21] Appl. No.: 08/870,500

[22] Filed: Jun. 6, 1997

[51] Int. Cl.$^7$ ........................................ B60J 5/04
[52] U.S. Cl. ................................................ 49/502
[58] Field of Search ........................... 49/348, 349, 350, 49/351, 352, 502; 296/146.5

[56] References Cited

U.S. PATENT DOCUMENTS

| | | | |
|---|---|---|---|
| 3,844,064 | 10/1974 | Yamaha et al. | 49/348 |
| 5,505,024 | 4/1996 | DeRees et al. | 49/502 X |
| 5,647,171 | 7/1997 | Wirsing et al. | 49/502 |
| 5,694,719 | 12/1997 | Bejune et al. | 49/502 |

FOREIGN PATENT DOCUMENTS

| | | |
|---|---|---|
| 0694427 | 7/1995 | European Pat. Off. . |
| 2626534 | 4/1989 | France . |
| 4343254 | 6/1994 | Germany . |
| 19526367 | 2/1996 | Germany . |
| 2117329 | 10/1983 | United Kingdom . |

*Primary Examiner*—Jerry Redman
*Attorney, Agent, or Firm*—Howard & Howard

[57] ABSTRACT

A method for mounting a carrier for a window-lifter mechanism in a shell of a vehicle door, the window lifter including at least one rail for guiding the window and the shell having an opening through which the carrier is introduced as well as, at its top, a well for the passage of the window; a) the rail is secured to its carrier with a mutual separation (d1) which is greater than the normal separation in the service position of the window lifter; b) the upper end of the rail is introduced into the shell; c) the upper end of the rail is made to enter the window well by raising the carrier and the window lifter; d) the lower end of the rail is passed over the lower rim of the opening; e) the carrier is pressed against a sealing border around the opening by lowering the assembly back down so that the lower end of the rail positions itself in the shell below the lower rim; f) and the rail is moved from its position of separation (d1) from the carrier into its normal service position (d2) by bringing it closer to the said carrier. This method makes it possible to produce a window lifter in which the guide rail or rails are longer than known rails, and this allows a corresponding increase in the travel of the window and makes it possible to use the volume inside the lower rim of the shell.

18 Claims, 6 Drawing Sheets

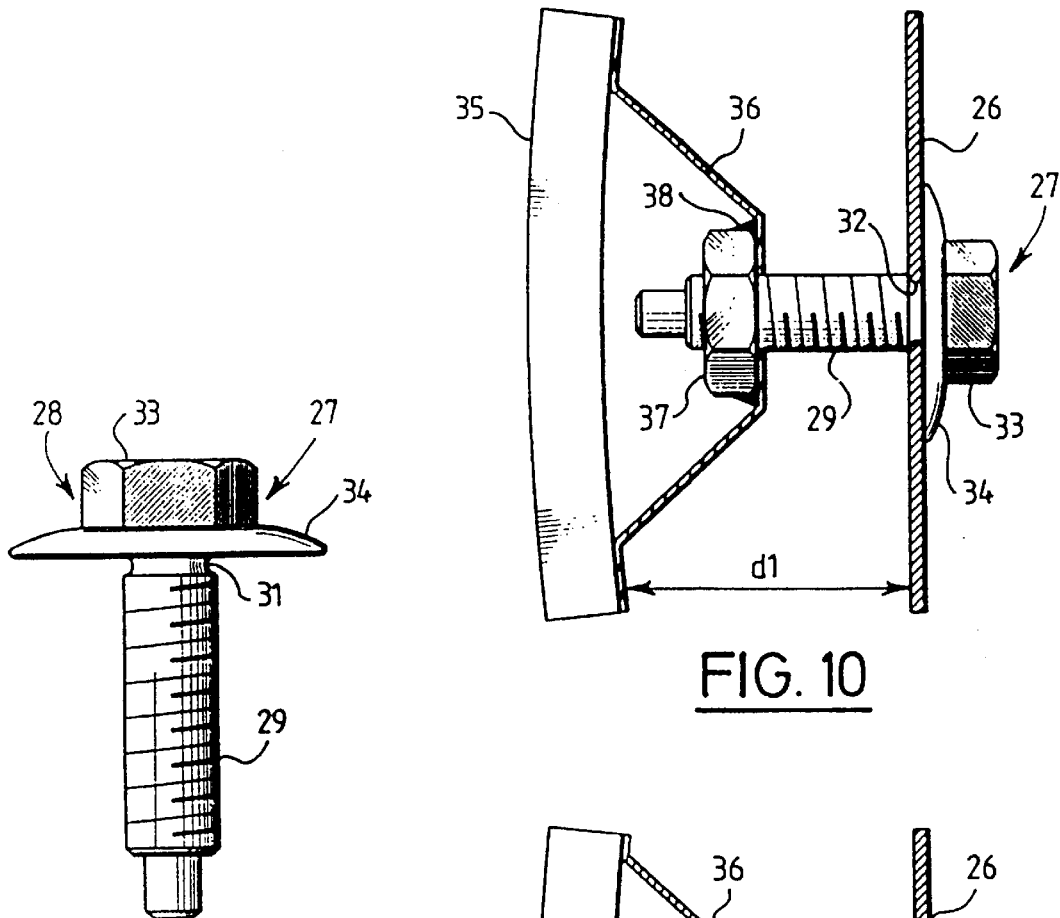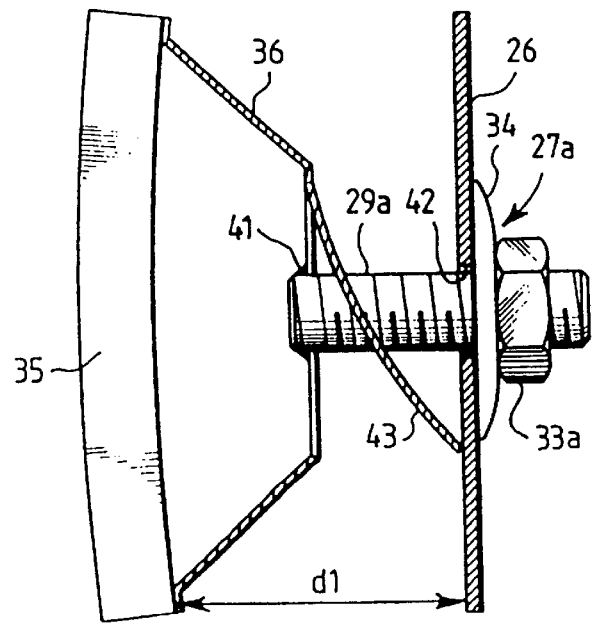

METHOD FOR THE SEALED MOUNTING OF A WINDOW-LIFTER MECHANISM IN A VEHICLE DOOR AND DOOR FOR THE APPLICATION OF THIS METHOD

BACKGROUND OF THE INVENTION

The present invention provides a method for mounting a window-lifter mechanism and its carrier in a shell of a vehicle door, as well as the corresponding vehicle door.

More specifically, the invention relates to a vehicle door equipped with a window lifter of the type having a cable and drum with at least one rail for guiding the travel of the window, and more particularly of the double rail-drum type (known as "double lift").

In this door, the shell has an opening for the introduction of the mechanisms. A carrier plate seals the opening necessary for the passage of the window-lifter mechanism, the top of the shell having a well for the passage of the window.

Door modules which concentrate all (or some) of the mechanisms mounted inside the door or on the door (lock, rail-type window-lifter mechanism etc.) on a carrier are known in the state of the art. The purpose of these modules is to make these elements easier to mount on the production lines.

The invention relates in particular to instances in which the carrier panel incorporates the sealing function. Incorporating the sealing function into the module imposes restrictions with respect to the space available inside the door shell, and with respect to the travel of the window. The raised position and the lowered position of the window define its travel. The window travel and the length of the slide determine the minimum length of the rail. The rail is attached to the carrier plate and the latter has a peripheral seal which provides a seal between the door and the interior of the vehicle around the periphery of the opening in the shell. The fascia reinforcement at the top of the door has a shape which is generally chosen to have the maximum moment of inertia. In addition, a volume needed to give the bottom of the shell a certain amount of rigidity is left available between the lower edge of the opening in the shell and the bottom of this shell.

When the rail with its carrier plate is mounted in the conventional way, the rail is pushed down inside the shell until it rests against the bottom thereof, then the whole assembly is tilted to provide contact with the sealing border of the opening of the shell. To allow the whole assembly to be tilted, it is necessary for the height available inside the door shell to be greater than or equal to the sum of the length of the rail and the height of the lower rim situated below the lower edge of the opening in the shell. Because the height of the rim cannot be zero, owing to the need to produce a door shell of sufficient stiffness, it is not possible to produce a rail which uses all the length available inside the shell, i.e. which extends into the height of the lower rim.

SUMMARY OF THE INVENTION

The present invention provides a method of mounting a window-lifter mechanism and its carrier in a door which allows the total length of the rail or rails to be increased by extending the length of the rail or rails into the volume available inside the rim of the shell, i.e. below the lower edge of the opening through which the window-lifter mechanism is introduced.

In accordance with the method of the present invention;
a) the rail of the window lifter is secured to its carrier with a mutual separation which is greater than the normal separation in the service position of the window lifter;
b) the upper end of the rail is introduced into the shell;
c) the upper end of the rail is made to enter the window well by raising the carrier and the window lifter;
d) the lower end of the rail is passed over the lower rim of the opening in the shell;
e) the carrier is pressed against a sealing border around the opening by lowering the assembly back down so that the lower end of the rail positions itself in the shell below the lower rim;
f) and the rail is moved from its position of separation from the carrier into its normal service position by bringing it closer to the said carrier.

The separation maintained temporarily for mounting purposes between the rail and its carrier plate permits the introduction of the rail far enough inside the shell of the door for it to be placed below the window well. By raising the assembly it is then possible to introduce the upper end of the rail into the window well and pass its lower end pass the rim of the opening in the shell, after which the assembly is lowered back down again to its normal position. The rail is then returned to its final service position.

The method of the present invention provides a substantial increase in the length of the rail so that its lower end extends inside the lower rim of the shell, which makes it possible to produce a rail which uses practically the entire length available in the shell.

The vehicle door of the present invention includes a shell in an inner panel having an opening for the passage of a window-lifter mechanism having at least one rail, generally two, for guiding the window. The rails are mounted on a carrier plate which is shaped to be pressed in a sealed manner around the periphery of the opening.

In accordance with the invention, the door comprises means for securing the rail to its carrier plate with a temporary mutual separation which is greater than the mutual separation when the window lifter is in the service position after it has been mounted in the door. Additional means are provided for moving the rail from its temporary position of separation to its normal position of separation, once the assembly has been mounted in the shell.

Other special feature and advantages of the invention will become clear in the course of the description which will follow, given with reference to the appended drawings which illustrate one embodiment thereof by way of non-limiting example.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 10 is a view in partial elevation of a third embodiment of the means providing the connection between the carrier plate and the guide rail;

FIG. 11 is a view in elevation of the bolt of the embodiment of FIG. 10;

FIG. 12 is a view similar to FIG. 10 of a fourth embodiment of the means providing the connection between the carrier plate and the rail of the window lifter.

DETAILED DESCRIPTION OF A PREFERRED EMBODIMENT

Figure 1:
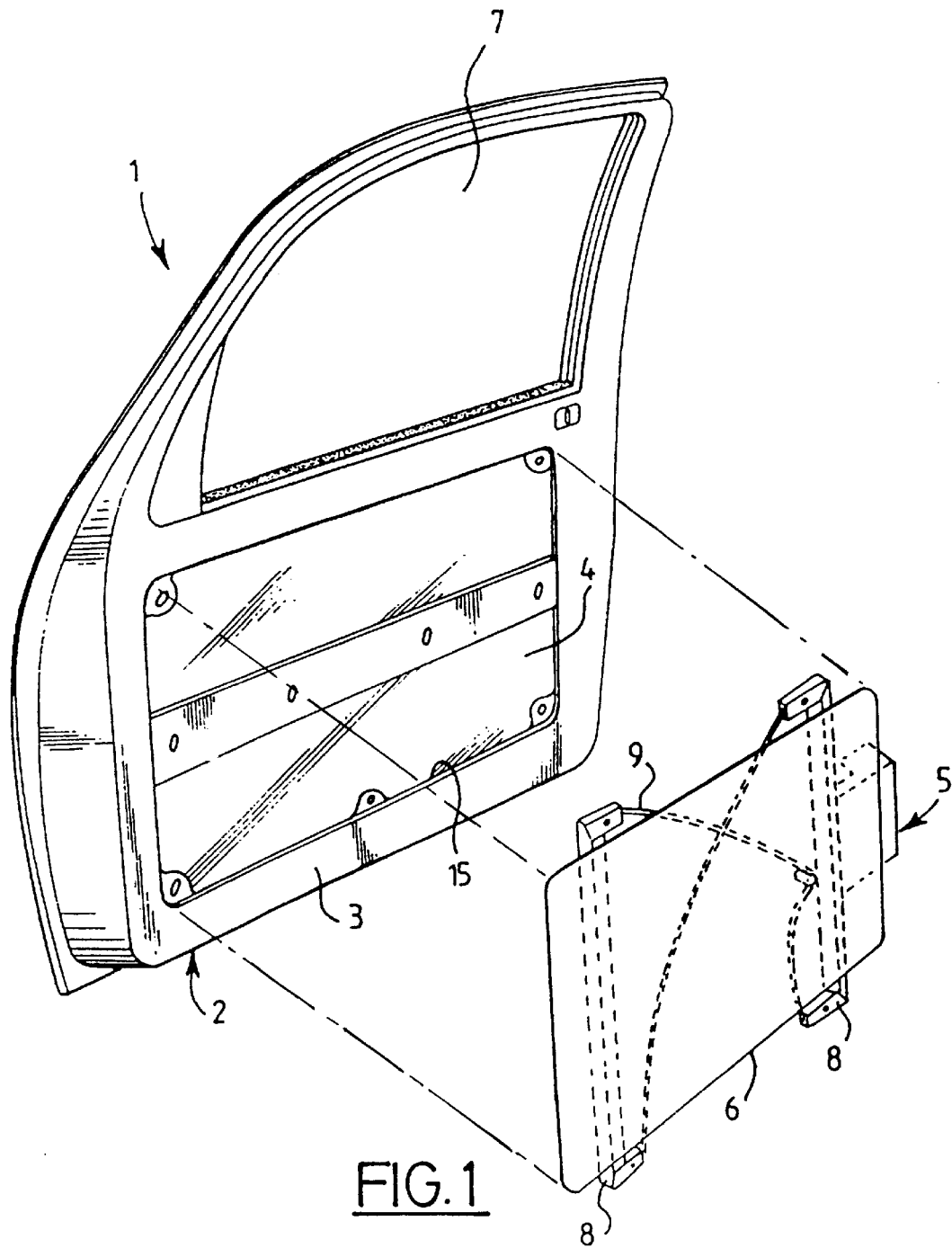
FIG. 1 is an exploded perspective view of a vehicle door and of the assembly of a window-lifter mechanism with its carrier, which can be introduced into the opening in the shell of the door.

The motor vehicle door 1 represented in FIG. 1 includes a shell 2 having an inner panel 3 in which is formed an opening 4 for the passage of the window-lifter mechanism 5 mounted on a carrier plate 6.

The window-lifter mechanism 5 is of the type that includes at least one rail 8 for guiding the window 7, namely two rails 8 which in the example represented are substantially parallel, and on which a cable 9 may run. The plate 6 may be made of sheet metal or of plastic and is designed to be able to be pressed in a sealed fashion around the periphery of the opening 4 for the introduction of the window lifter 5. The latter is of a type known per se and does not require description in further detail.

Figure 2:
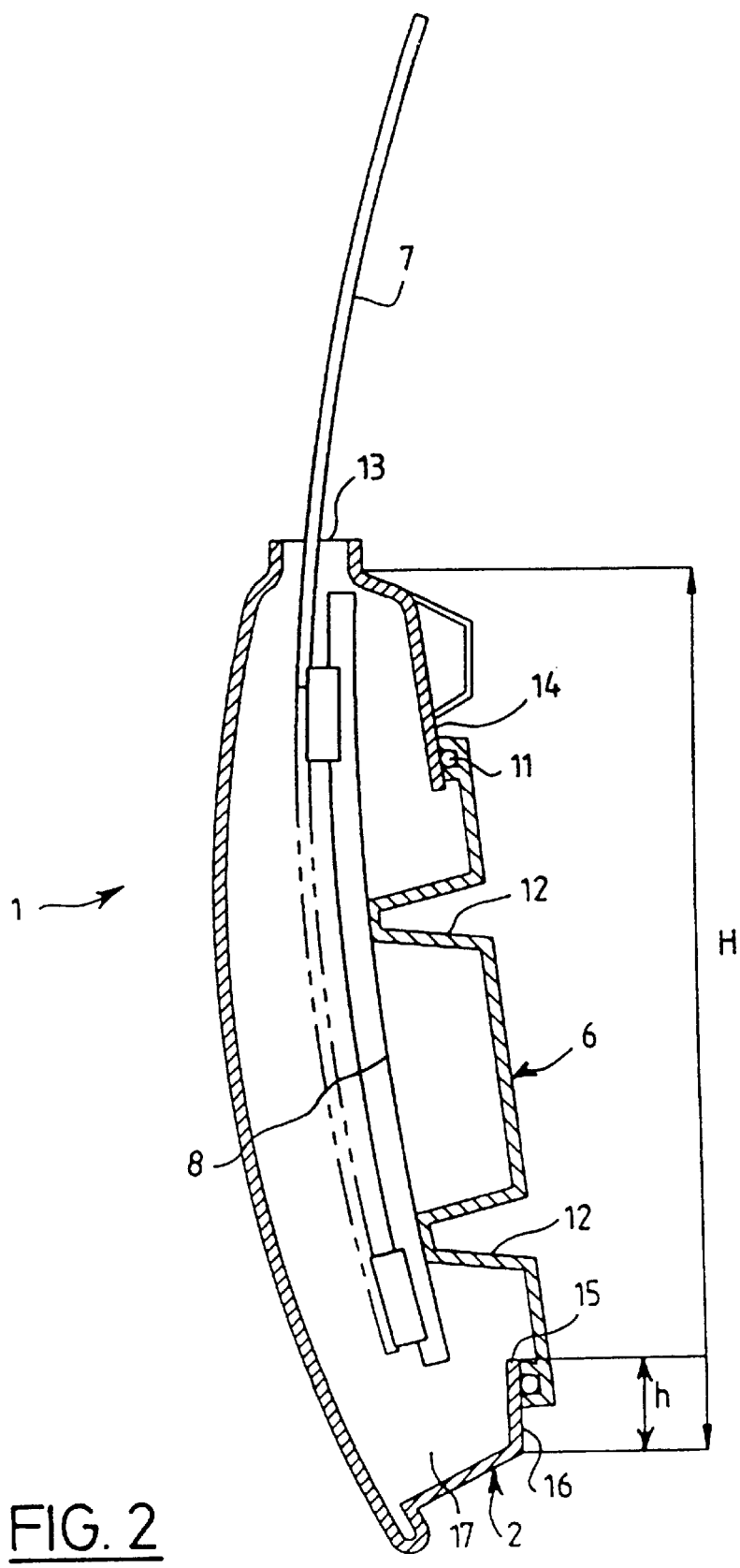
FIG. 2 is an diagrammatic, partial sectional, view in elevation of a motor vehicle door and a window-lifter mechanism with a rail for guiding the travel of the window, of a known type.
Figure 3:
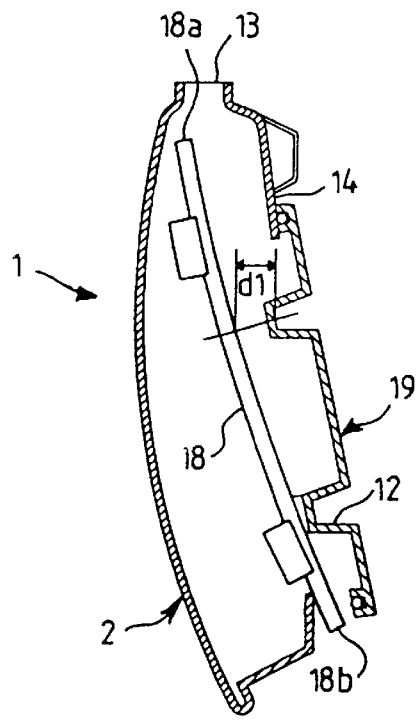
FIGS. 3, 4, 5 and 6 are views in elevation and part cross-section of a vehicle door equipped with a window-lifter and carrier plate assembly in accordance with the present invention, and illustrates the sequence followed in mounting it the shell of the door.
Figure 4:
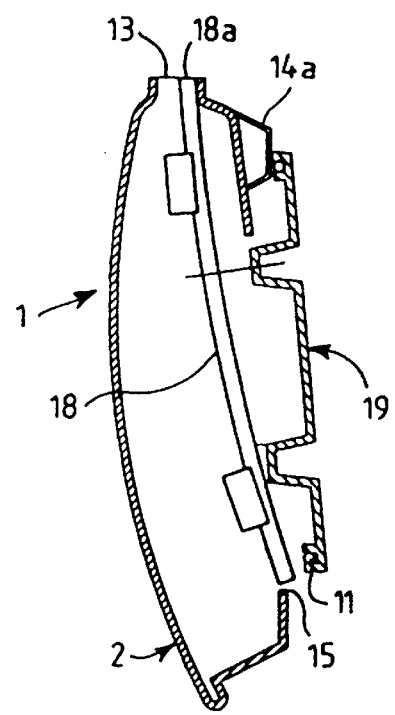
Figure 5:
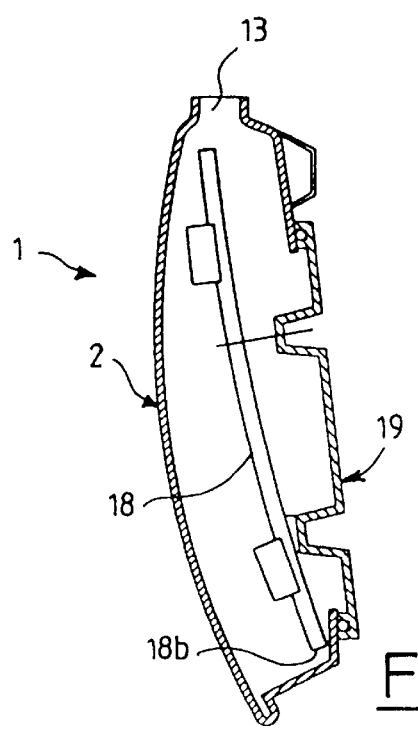

FIG. 2 represents the window lifter and its carrier plate 6 in the mounted and service position inside the door 1. The plate 6 is pressed onto the periphery of the opening 4 in a sealed manner thanks to a seal 11 and has folds 12 pointing towards the inside of the shell 2, at the ends of which the rail (or rails) 8 is (or are) fixed.

In the raised position, the window 7 passes through a window well 13 at the top of the shell 2, the top being delimited internally by a fascia strip 14 which accommodates the seal 11 and is provided with a reinforcement 14a. The lower edge 15 of the opening 4 is delimited by a shaped rim 16 of the shell 2, this rim 16 forming an internal volume 17 inside the shell 2.

As seen in FIG. 2, the length of the rail 8 is less than the height available in the door shell 2, essentially on account of the presence of the rim 16 which has a height h, the effect of which is that the lower end of the rail 8 must be substantially level with the lower edge 15 of the opening 4. The assembly of the carrier 6 and of the window lifter including the rail or rails 8 is put in place inside the door 1 as indicated earlier, with the volume 17 unused.

The door in accordance with the invention will now be described with reference more particularly to FIGS. 3 to 11.

The carrier plate 19 is generally planar and the rail 8 or rails 8 are laterally spaced from and generally parallel to the carrier plate 19. The rail 8 is secured to its carrier plate 19 with a lateral, mutual separation d1 (FIGS. 3 and 7) which is greater than the normal separation d2 (FIG. 7) of the window lifter after mounting in the door 1. Additional means are provided to move the rail laterally to bring the rail 18 from its position of temporary separation d1 to its position of normal separation d2 in the service position.

Figure 7:
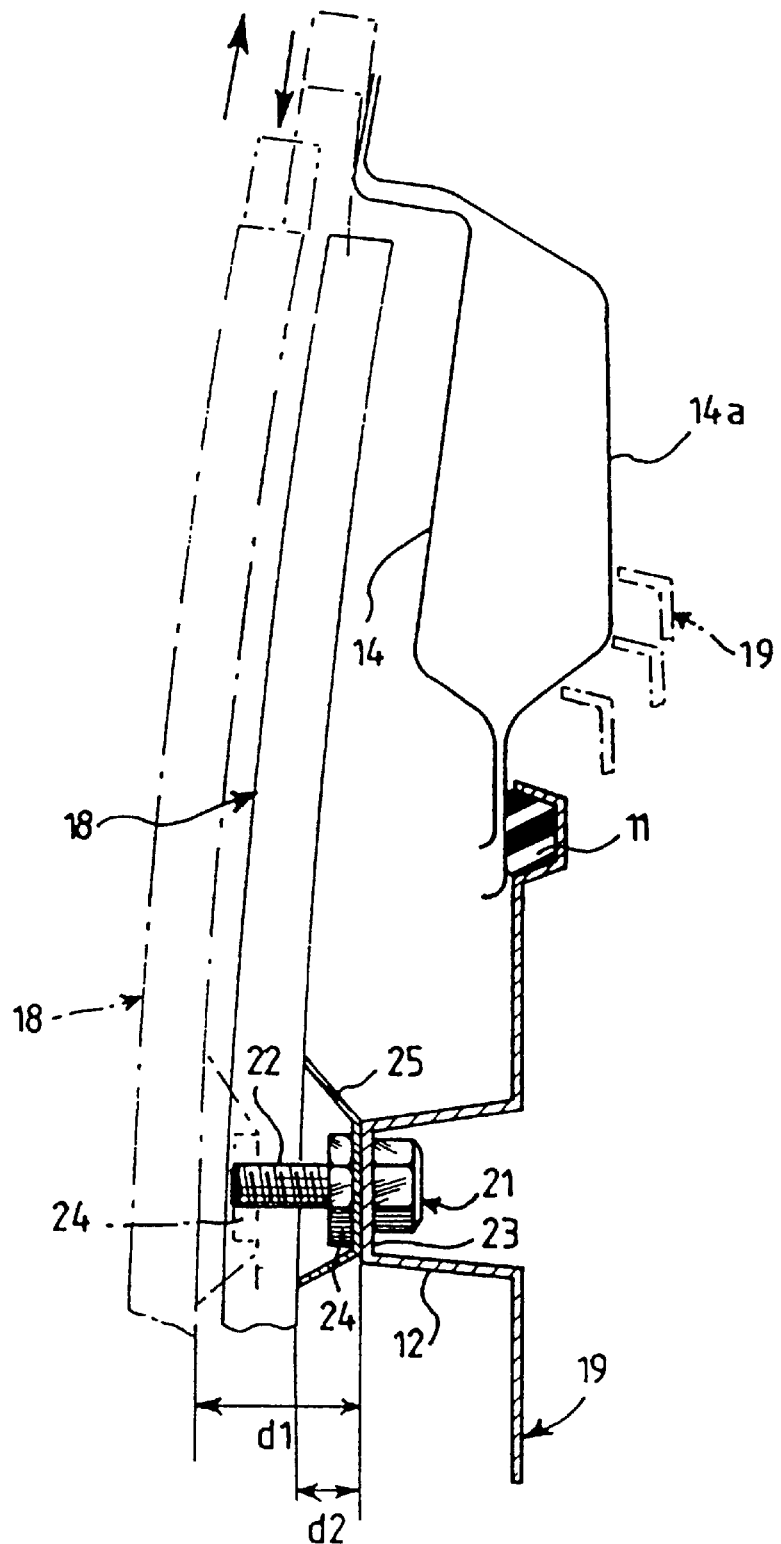
FIG. 7 is a view in elevation and part section, on a larger scale compared with FIGS. 3 to 6, of a window-lifter rail and carrier plate assembly according to a first embodiment of the means providing connection between the carrier plate and the rail.

If the carrier plate 19 is made of sheet metal, the aforementioned securing means comprise, in a first embodiment illustrated in FIG. 7, a screw 21 the threaded shank 22 of which passes through the bearing region 23 of the carrier plate 19. Only the end of the threaded shank 22 is screwed into a nut 24 secured to the rail 18. The nut 24 is fixed internally to a boss or to a lug 25 on the rail 18, for example by welding. When the module is mounted in the door, the rail 18 is placed at the distance d1 from the bearing region 23. Screwing the bolt 21 into the stationary nut 24 makes it possible to move the latter, and therefore the whole rail 18 assembly, closer to the carrier plate 19 until the distance d1 has been brought down to d2 (FIG. 7).

The bolt 21 and the nut 24 are arranged at the upper part of the metal sheet 19, while a slightly deformable fixed connection produced in a way known per se and not represented is provided between the lower bearing region 23 of the plate 19 and the lower part of the rail 18.

Figure 6:
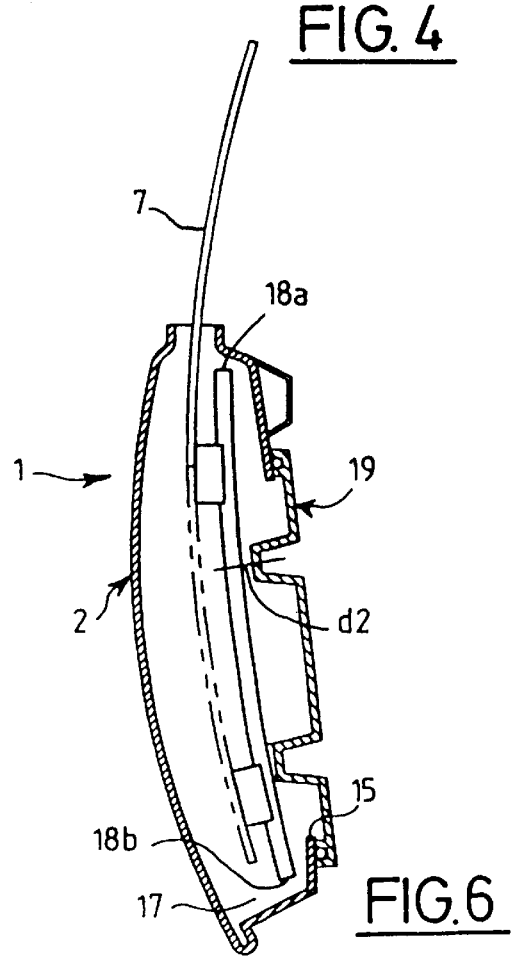

The method of mounting the carrier plate 19 and the window lifter incorporating the rail or rails 18 is as follows:

a) The rail 18 is secured to its carrier 19 with the mutual separation d1 as explained above;

b) The upper end 18a of the rail 18 is introduced into the top of the shell 2, the lower end 18b of this rail at this stage remaining outside the shell 2 and bearing on the lower edge 15 of the opening 4 (FIG. 3); the upper edge of the carrier plate 19 is bearing on the fascia 14 while the lower end 18b of the rail 18 is bearing on the lower edge 15 of the opening 4.

c) The carrier 19 and window lifter assembly is raised to pass the lower end 18b of the rail 18 over the lower rim 15 and make the upper end 18a enter the window well 13 (FIG. 4); at this stage in the method of mounting, the seal 11 is bearing on the internal wall 14a of the fascia 14.

d) The successive positions of the rail 18 and of the upper end of the plate 19 during its movements are represented in chain line in FIG. 7.

e) The carrier 19 and rail 18 assembly are lowered back down inside the shell 2 so that the lower end 18b of the rail 18 positions itself in the volume 17 of the shell 2, below the lower rim 15 (FIG. 5), the carrier plate 19 being pressed via its seals 11 on the sealing border around the opening 4;

f) The rail 18 is moved from its position separated from the upper bearing zone 23 by the distance d1 into its normal service position by screwing in the bolt 21 as explained earlier until the distance between the rail 18 and the bottom 23 is equal to d2. The rail 18 has therefore reached its final service position, set back from the window well 13 to leave the latter free for the travel of the window 7 (FIG. 6).

Thus the rail(s) 18 of the window lifter may have a height substantially greater than that of rails used hitherto, because their lower end 18b can extend below the level of the edge 15 into the volume 17. The travel of the window 7 can therefore be increased by this same amount.

In the second embodiment illustrated in FIGS. 10 and 11, the carrier sheet 23 is flat and a bolt 27 includes between its head 28 and its threaded shank 29 a groove 31 the diameter of which is slightly greater than the diameter of a hole 32 for the insertion of the threaded shank 29 through the plate 26. In the example represented the head 28 includes, besides the nut 33, a washer 34 designed to come and bear on the outer face of the carrier plate 26. The rail 35 has a boss 36 inside which a nut 37 is fixed by means of a run of welding 38.

The fitter introduces the threaded shank 29 into the hole by force, screwing it in until the edge of the opening 32 become housed in the groove 31. At the same, the end of the shank 29 is screwed into the nut 37 so as to hold the rail 35 at the temporary mounting separation d1 from the plate 26. The fact that the edge of the opening 32 is gripped tightly in the groove 31 makes it possible for the carrier plate 26 to be immobilized with respect to the bolt 27, which when screwed in allows the rail 35 to be moved from its separation distance d1 to its service distance d2.

The groove 31 is not indispensable, but the hole 32 for the passage of the shank 29 through the sheet 26 would still need to have a diameter slightly smaller than the nominal diameter of the threaded shank 29. The difference in diameter between the screw 29 and the hole in the metal sheet 26 through which it is introduced, prevents this sheet from moving.

It is advantageous, although not compulsory, for the rail to be held in the delivery position with the separation d1, and for it to be unable to change position without deliberate action on the part of the fitter. Thus for example in FIG. 10, to achieve this, all that is required is for the hole 32 to have a diameter larger than that of the screw 29, in which case the fitter manually carries out the desired adjustment.

In the embodiment illustrated in FIG. 12, the means providing the connection between the sheet metal plate 26 and the rail 35 comprises a threaded shank 29a the end of which is secured to the boss 36, for example by a run of welding 41. The screw 29a passes through the sheet metal 26 via a hole 42 and is fitted on the outside of the carrier sheet 26 with a nut 33a which can be screwed onto the screw 29a with the interposition of a washer 34.

An elastic member which in the example represented consists of a prestressed tongue 43 formed integrally of the material of the boss 36, is inserted between the rail 35 and the carrier plate 26, exerting elastic thrust on the latter. The tongue 43 and its elastic thrust are determined in such a way that when the end of the screw 29a is fixed to the boss 36, this thrust keeps the carrier plate 26 at the temporary mounting separation d1 with respect to the rail 35.

Tightening the nut 33a which is positioned on the outside of the plate 26 causes compression of the elastic tongue 43 and therefore makes the rail 35 move closer to the carrier plate 26 until the service position is reached.

In an alternative form, the tongue 43 may be replaced, for example, by a helical spring.

Figure 8:
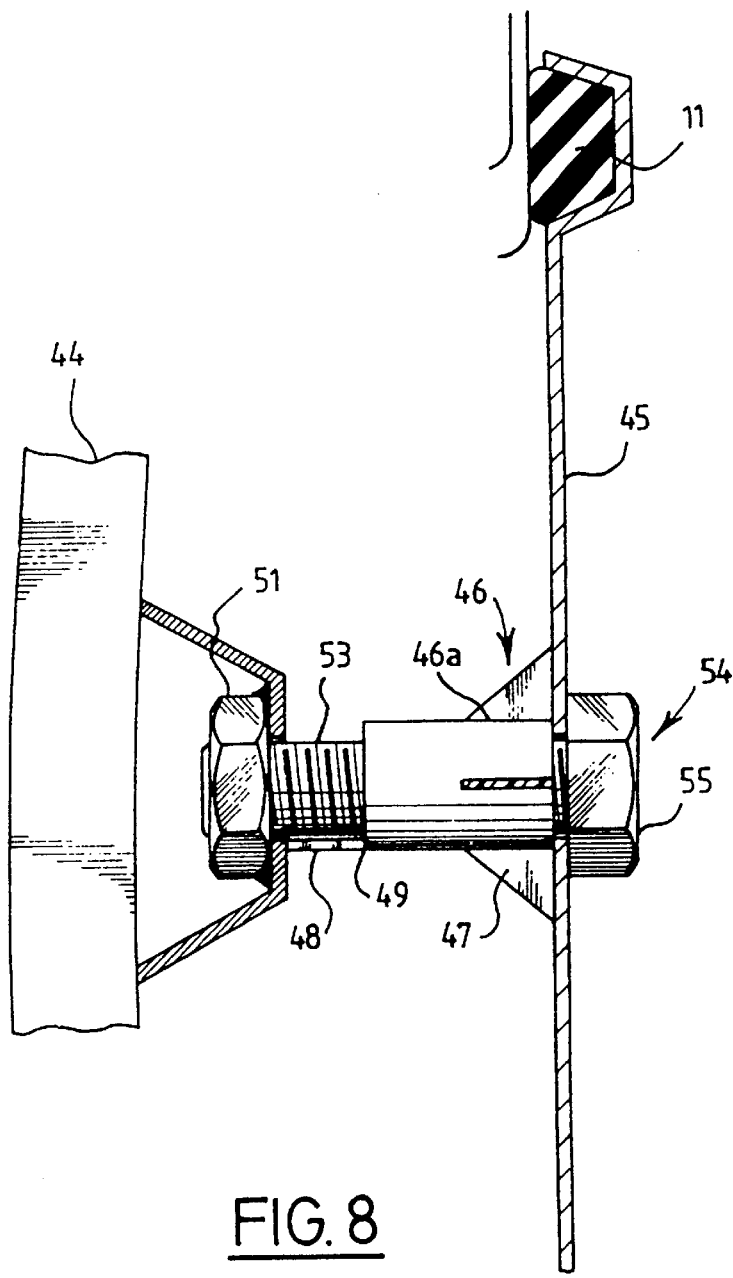
FIG. 8 is a view in elevation similar to FIG. 7 of a second embodiment of the means providing a connection between the carrier plate and the rail of the window lifter.
Figure 9:
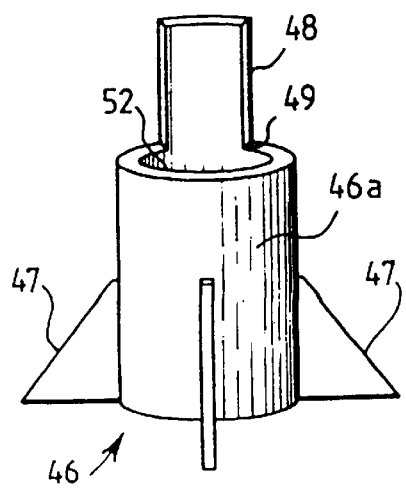
FIG. 9 is a view in perspective on an enlarged scale compared with FIG. 8 of one component of the device providing the connection between the carrier plate and the guide wall.

The embodiment of the means providing the connection between the rail 44 and the carrier plate 45 as illustrated in FIG. 8 is suited to instances in which the carrier plate 45 is made of plastic.

An element attached to the carrier plate 45 consisting of a cylindrical part 46 (FIG. 9) with fins 47 for bearing against the plate 45 has a tab 48 with a rupture starter line 49 for breaking it off the cylindrical portion 46a of the part 46. This tab 48 extends the cylindrical portion 46a and may, as represented, consist of a circular sector with a length such that when the part 46, which forms a spacer piece, is inserted between the carrier plate 45 and a nut 51 fixed to the rail 44, for example by clinching, the end of the tab 48 bears against the nut 51. The internal bore 52 of the cylindrical portion 46a is tapped in such a way as to be able to take the screw part 53 of a bolt 54, the nut head 55 of which bears on the outer face of the plate 45 when the end of the screw 53 is engaged in the nut 51.

In this position, in which the end of the tab 48 is in contact with the nut 51, screwing in the bolt 54 causes the nut 51 and the rail 44 to move closer to the plate 45 and therefore causes the tab 48 to break. Tightening continues until the rail 44 comes into its service position with respect to the plastic plate 45.

In an alternative form, this device may be replaced, for example, by tags, clips or ribs designed to keep the rail temporarily in the position it has on delivery. The operating or service position of the rail is obtained by breaking, unclipping or deforming these spacer pieces.

What is claimed is:

1. A vehicle door comprising:
    a shell including an inner panel having an opening;
    a carrier plate mounted over the opening;
    at least one window guide rail;
    means for securing the rail to the carrier plate with a temporary separation (d1) therebetween;
    means for moving the rail from its position of temporary separation (d1) to its normal service position of separation (d2) which is less than the temporary separation (d1); and
    a spacer disposed between the rail and the carrier plate maintaining the rail at the temporary separation (d1) from the carrier plate.

2. The door according to claim 1, wherein a lower end of the rail extends inside a lower edge of the opening and below the lower edge of the opening.

3. The door according to claim 1, wherein the means for moving the rail comprises a first threaded member on the carrier plate and a complementary second threaded member on said rail, the first and second threaded members being threadably connected to a first position when the temporary separation (d1) exists between the carrier plate and the rail, the first and second threaded members being threadably connected to a second position when the carrier plate and the rail are in the service position of separation (d2).

4. The door according to claim 3, wherein the first threaded member is a bolt passing through the carrier plate, the bolt having a threaded shank only a portion of which is threaded into the second threaded member on the rail to maintain the temporary separation (d1) between the carrier plate and the rail.

5. The door according to claim 4, wherein said bolt includes a groove formed between a head of the bolt and the threaded shank, the bolt being inserted through the hole in the carrier plate, the carrier plate disposed within the groove in order to hold the carrier plate in place with respect to the bolt.

6. The door according to claim 1 wherein the spacer is a prestressed elastic member disposed between the rail and the carrier plate biasing the rail away from the carrier plate, thus maintaining the rail at the temporary separation (d1) from the carrier plate.

7. The door according to claim 6, wherein the elastic member is a tongue formed integrally as a part of the rail inserted between the rail and the carrier plate.

8. The door according to claim 1, wherein the spacer is a breakaway element disposed between the rail and the carrier plate, the breakaway element maintaining the temporary separation (d1) until it breaks.

9. The door according to claim 8, wherein the breakaway element includes a tab with a rupture starter line, such that moving the rail from the temporary separation (d1) to the service position with separation (d2) causes the tab to break.

10. A vehicle door comprising:
    a shell including an inner panel having an opening;
    a carrier plate mounted adjacent the opening;
    at least one window guide rail secured to the carrier plate, the rail being selectively movable from a first position relative to the rail having a temporary separation (d1) between the rail and carrier plate to a normal service position of separation (d2) which is less than the temporary separation (d1); and a spacer disposed between the rail and the carrier plate maintaining the rail at the temporary separation (d1) from the carrier plate.

11. The door according to claim 10, wherein a lower end of the rail extends below the lower edge of the opening.

12. The door according to claim 10, further including:

a first threaded member on the carrier plate;

a complementary second threaded member on said rail;

the first and second threaded members being threadably connected to a first position when the temporary separation (d1) exists between the carrier plate and the rail, the first and second threaded members being further threaded to a second position when the carrier plate and the rail are in the service position of separation (d2).

13. The door according to claim 12, wherein the first threaded member is a bolt passing through the carrier plate, the bolt having a threaded shank only a portion of which is threaded into the second threaded member on the rail to maintain the temporary separation (d1) between the carrier plate and the rail.

14. The door according to claim 13, wherein said bolt includes a groove formed between a head of the bolt and the threaded shank, the bolt being inserted through the hole in the carrier plate, the carrier plate disposed within the groove in order to hold the carrier plate in place with respect to the bolt.

15. The door according to claim 10, wherein the spacer is a prestressed elastic member disposed between the rail and the carrier plate biasing the rail away from the carrier plate, thus maintaining the rail at the temporary separation (d1) from the carrier plate.

16. The door according to claim 10, wherein the spacer is a breakaway element disposed between the rail and the carrier plate, the breakaway element maintaining the temporary separation (d1) until it breaks.

17. The door according to claim 16, wherein the breakaway element includes a tab with a rupture starter line, such that moving the rail from the temporary separation (d1) to the service position with separation (d2) causes the tab to break.

18. The door of claim 10 wherein the spacer is mechanically coupled between the carrier plate and the rail.

* * * * *